(No Model.) 2 Sheets—Sheet 2.
T. A. EDISON.
SYSTEM OF ELECTRICAL DISTRIBUTION.
No. 545,405. Patented Aug. 27, 1895.
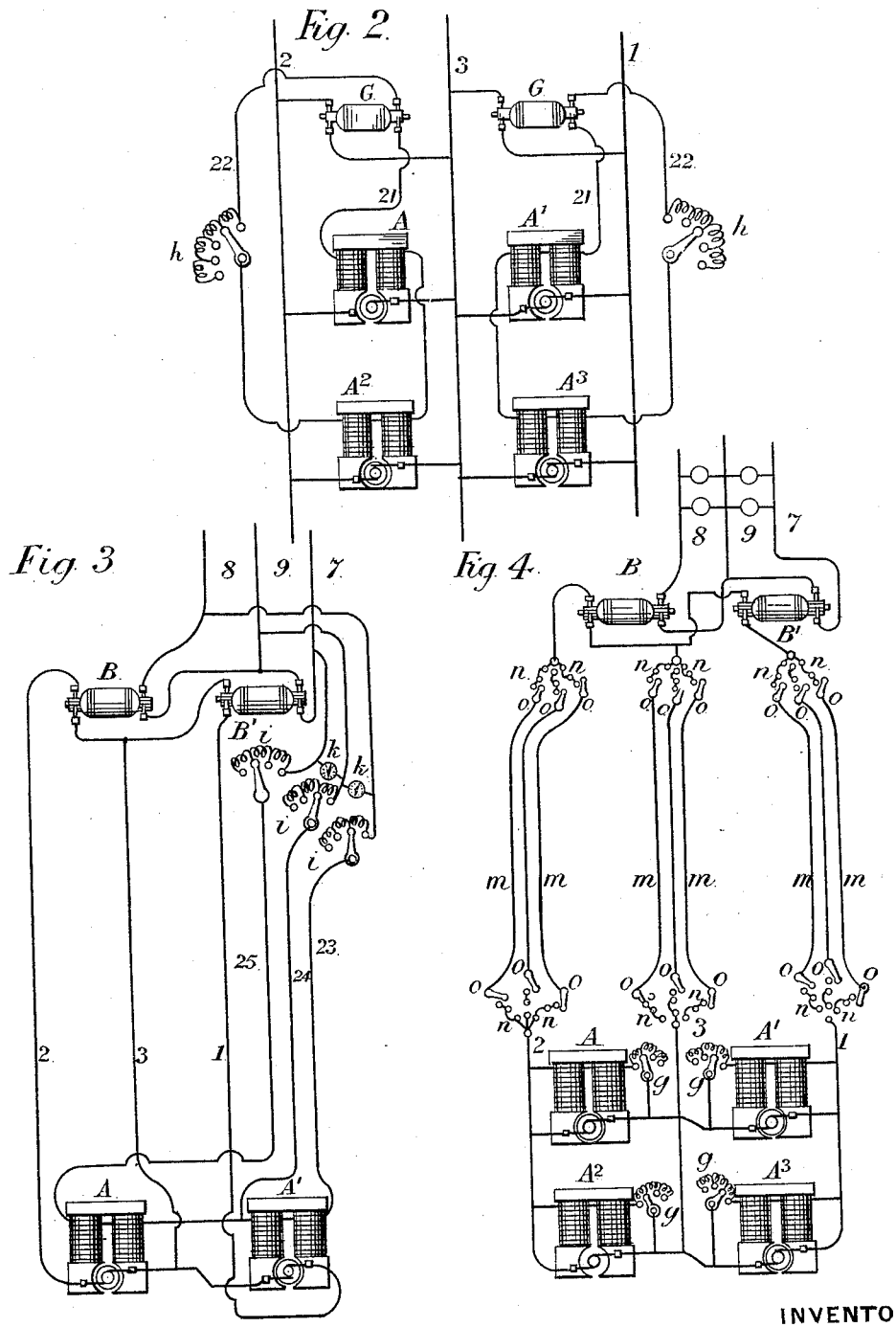
WITNESSES.
INVENTOR.
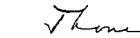
By
Attorneys.

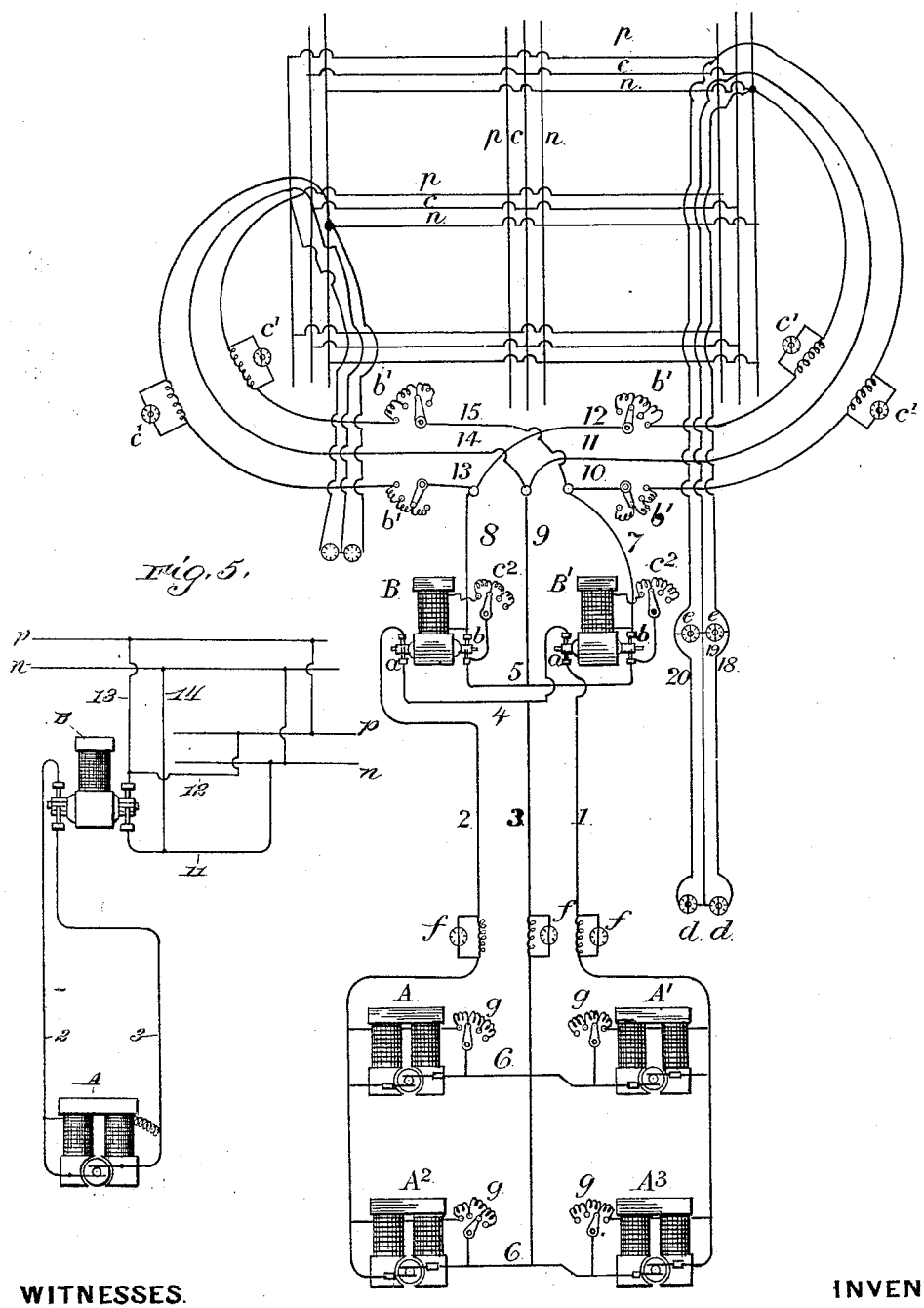

UNITED STATES PATENT OFFICE.

THOMAS A. EDISON, OF LLEWELLYN PARK, NEW JERSEY.

SYSTEM OF ELECTRICAL DISTRIBUTION.

SPECIFICATION forming part of Letters Patent No. 545,405, dated August 27, 1895.

Original application filed December 6, 1886, Serial No. 220,799. Divided and this application filed August 29, 1887. Serial No. 248,108. (No model.)

*To all whom it may concern:*

Be it known that I, THOMAS A. EDISON, of Llewellyn Park, in the county of Essex and State of New Jersey, have invented a certain new and useful Improvement in Systems of Electrical Distribution, (Case No. 729,) of which the following is a specification.

My invention relates to systems of electrical distribution of that character in which a current of high tension is employed generated at a station situated at a distance from the place to be supplied and conveyed by small conductors to such place, where it is converted by tension-reducing converters to a current of low tension adapted for use in electric lighting or for other domestic or business purposes.

The main feature of my invention is the placing of the tension-reducing converter or converters at a sub-station within or near the district supplied, from which feeding-circuits extend to the lighting-circuits of the district, at which sub-station suitable indicating and regulating devices are placed to regulate the supply of current, suitable indicating and regulating devices being also placed at the main station for regulating the current supplied to the sub-station, as will be presently more fully explained. I prefer to arrange the whole system upon the three-wire plan, with the main source a divided one, and a compensating conductor extending from the converters to the point of division, and the converters also are arranged as a divided source, with a compensating conductor extending from the translation-circuits to its point of division. It will be evident, however, that the simple two-wire multiple-arc system may be employed in connection with the principal features of my invention.

My invention further consists in the various novel arrangements and constructions of generators, circuits, regulators, indicators, and other devices employed by me to produce a complete, simple, efficient, economical, and readily-regulated system, as hereinafter described and claimed.

In the annexed drawings, Figure 1 is a diagram of a complete system embodying my invention; Fig. 2, a diagram illustrating another way of energizing and regulating the fields of the generators; Fig. 3, a diagram illustrating the manner of accomplishing from the sub-station the regulation at the main station; Fig. 4, a diagram showing the preferred arrangement of the conductors leading from the main station to the sub-station, and Fig. 5 is a diagram illustrating the invention applied to a two-wire distribution system.

Referring first more particularly to Fig. 1, A, A', A², and A³ are generators of electricity of high tension arranged in multiple series and having a circuit 1 2 extending from their terminals. There may, however, be only one series of generators or there may be any desired number; or there may be more than two generators in each series if desired. These generators are placed at the main station, which is situated at any point where power is economically available.

Within or near the district to be supplied with current is situated a sub-station, where are placed tension-reducing converters B and B'. Those shown are rotating converters, each having one set of coils receiving the high-tension current by commutator $a$, and another set of coils discharging a lower-tension current by commutator $b$. The high-tension coils are connected in series by a conductor 4 and the low-tension coils by a conductor 5. From conductor 4 a conductor 3 extends back to the main station and is there joined to conductors 6 6, which connect the two generators in series. The high-tension coils or primary circuits of the converters are thus in the three-wire high-tension circuit 1 3 2 from the generators. From the low-tension coils or secondary circuits of the converters a three-wire circuit 7 9 8 extends, which conveys the comparatively low-tension current from such secondary coils. The circuit 7 9 8 extends to suitable terminal points or to omnibus conductors within the sub-station, from which the feeding-circuits extend.

10 11 12 and 13 14 15 represent two feeding-circuits. There may be any desired number of such circuits and they extend to centers of consumption in the district supplied, where they are joined to the system of intersecting and connected positive, negative, and compensating mains or lighting-circuits $p$ $c$ $n$, with which the house-circuits and translating devices (not shown) are connected in multiple arc. In each side of each feeding-circuit is an adjustable resistance $b'$ and a current-indicator $c'$. The field-magnets of the rotating converters are preferably energized as shown by shunt-circuits from the low-tension circuits, such shunts including adjustable resistances $c^2 c^2$. The field-circuits may, however, be taken from the high-tension circuit, in which case the field-magnets are wound with fine wire.

In Fig. 5 the generator, converter, and circuits are lettered and numbered to correspond with corresponding parts in the three-wire system illustrated in Fig. 1. $p \, n$ are the positive and negative conductors of a connected system of electrical distribution, the circuits 13 14 and 12 11 leading in multiple arc from the secondary of the converter to different points in the connected system. From a suitable point on the system of lighting-conductors, preferably, as shown, the terminals of a feeder, an indicating-circuit 18 19 20 extends. The indicating-circuit extends back to the main station, where it is connected with suitable indicating devices $d \, d$, which show the pressure in the system of lighting-conductors. Preferably the indicating-circuit is made to extend through the sub-station, and is there provided with indicators $e \, e$, so that the pressure may be known also at the sub-station. Indicating-circuits also extend from the terminals of each of the other feeding-circuits to the sub-station. Current-indicators $f \, f$ are placed in the high-tension circuit 1 3 2 at the main station to show the current flowing thereon.

As shown in Fig. 1, the field-magnets of the high-tension generators are energized by shunt-circuits from the high-tension line provided with adjustable resistances $g \, g$ for regulating their strength. I prefer, however, to energize these field-magnets by a low-tension current, and to this end I may employ the arrangement shown in Fig. 2. In this arrangement tension-reducing converters G G, which, as shown, are rotating converters such as already described—the field-magnets being omitted in the drawings—are connected in series across the high-tension circuit, there being a converter for each side of the system, and from the generating-coils of each a circuit 21 22 extends, which includes the field-coils of the machines on the same side of the system, an adjustable resistance $h$ for regulating being placed in each of said circuits.

Another arrangement is shown in Fig. 3, in which a three-wire circuit 23 24 25 is brought back from the low-tension circuit 7 9 8 beyond the converters at the sub-station to the main station, where it includes the field-magnets of the high-tension generators, of which there may be any desired number, as already explained. With this arrangement I prefer to place adjustable resistances $i \, i$ at the sub-station in the circuit 23 24 25, whereby the regulation of the generators at the main station may be performed at the sub-station. Indicators $k \, k$ may be placed across this circuit at the sub-station to show the condition thereof.

Fig. 4 shows the construction and arrangement which I prefer for the high-tension circuit. Each conductor of this circuit is composed of two or more strands $m$, insulated or electrically separated from one another and each provided at or near each end with a fusible safety-catch $n$ and a suitable switch $o$. By this means if a cross or ground connection occurs on any strand, one or both of its safety-catches will be fused, and thereby that strand will be cut out of circuit while the current will be conveyed by the remaining strands, and by means of the switches any strand which may require repair may be cut out of circuit, so that it may be handled without stopping the operation of the system and without danger to the workman from the high-tension current. In this figure the high-tension generators are shown as having their fields energized in the same manner as in Fig. 1.

In the operation of the above-described system the operator at the main station, by means of the indicators $d \, d$, connected with circuit 18 19 20, is shown the pressure at the terminals of the feeding-circuit 10 11 12. In accordance with these indications he so manipulates the field-magnets of the generators as to maintain the desired constant pressure at this point. Thus a feeder with standard pressure constantly maintained is provided as a standard feeder, and the other feeders are regulated at the sub-station by the adjustable resistances included in them to provide for unequal distribution or changes in number of translating devices in circuit in different parts of the district. In the arrangement in which the main-station regulation is performed at the sub-station the whole operation is, of course, performed there. The two sides of the system are regulated to maintain the balance by the separate adjustment of resistances $g$ or $h$ in the opposite sides at the main station, or the resistances $i$ at the sub-station, in the field-circuits of the generators.

The resistances $c^2$ in the field-circuits of the converters are to regulate the speed of rotation thereof. It is evident that any desired number of converters may be placed in multiple series or multiple arc across the high-tension and low-tension lines. If it is desired to introduce an additional converter into the circuit to meet an increase in the current required, I first connect the field-magnet and charge it and then throw in the low-tension armature or generator coils. The machine then starts as a motor, taking current from the other converters. When it has been brought up to the required speed, the high-tension or motor armature-coils are thrown in, when the machine instantly becomes a converter, giving current to the line.

While I have described the system as employing continuous-current generators and rotating converters, it is evident that all of the features described except those relating to the regulation of the field-magnets of the converters are applicable also to systems in which alternating-current generators are employed and stationary inductoriums are used as converters.

I do not claim herein the arrangment and construction for the conductors of the high-tension circuit substantially as illustrated in Fig. 4 of the drawings—that is, making each of such conductors in two or more electrically-separated strands, and providing each of said strands with one or more safety catches and switches, since this is claimed in my application filed December 6, 1886, Serial No. 220,799, of which this application is a division.

What I claim is—

1. In a system of electrical distribution, the combination of a source of electricity of high tension, a circuit extending therefrom, tension reducing converters in series across said circuit, translation circuits supplied by said converters and a conductor extending from between said converters to the source of supply, substantially as set forth.

2. In a system of electrical distribution, the combination of a source of electricity of high tension, a circuit extending therefrom, tension reducing converters having their primary circuits in series across said circuit, a low tension circuit extending from the secondary circuits of said converters, said secondary circuits being joined in series, translating devices in multiple series across said low tension circuit, a conductor extending from between the translating devices to the secondary converter circuits, and a conductor extending from between the primary converter circuits to the high tension source, substantially as set forth.

3. In a system of electrical distribution, the combination of a main station or source of supply, a circuit extending therefrom to a sub-station, a circuit extending from said sub-station supplying translating devices, and means at the sub-station for regulating the generation of current at the main station, substantially as set forth.

4. In a system of electrical distribution, the combination of a source of electricity of high tension, a circuit extending therefrom, rotating converters having their high tension or primary coils connected with the high tension circuit and their secondary coils discharging a current of low tension, and means for regulating the field magnets of said converters, substantially as set forth.

5. In a system of electrical distribution, the combination of a source of electricity of high tension, a circuit extending therefrom, rotating converters having their primary coils connected with said high tension circuit and their secondary coils discharging a current of low tension, and a circuit connected with said secondary coils for energizing the field magnets of said converters, substantially as set forth.

This specification signed and witnessed this 26th day of August, 1887.

THOS. A. EDISON.

Witnesses:
CLARENCE T. VAN DEVEN,
CHAS. H. HEELEY.